United States Patent [19]
Easterly et al.

[11] Patent Number: 5,792,429
[45] Date of Patent: Aug. 11, 1998

[54] NITROGEN INSERTION PROTECTION SYSTEM

[75] Inventors: Thomas Peyton Easterly, Friendswood; William Ogle Jones, Houston, both of Tex.

[73] Assignee: Catalyst Technology, Pasadena, Tex.

[21] Appl. No.: 775,063

[22] Filed: Dec. 27, 1996

Related U.S. Application Data

[60] Provisional application No. 60/009,525, Dec. 28, 1995.
[51] Int. Cl.⁶ .................. G05B 9/00; C10G 35/00
[52] U.S. Cl. .................. 422/117; 422/145; 422/147; 422/213; 422/219; 208/173; 208/174
[58] Field of Search .................. 422/145, 147, 422/117, 213, 219; 208/173, 174

[56] References Cited

U.S. PATENT DOCUMENTS

| | | | |
|---|---|---|---|
| 4,029,599 | 6/1977 | Pegels | 252/414 |
| 4,933,150 | 6/1990 | Haddad et al. | 422/147 |
| 5,338,440 | 8/1994 | Sechrist et al. | 208/173 |

*Primary Examiner*—Nina Bhat
*Attorney, Agent, or Firm*—Fredrik Marlowe

[57] ABSTRACT

Problems with pressure in a catalyst bed contained within a vessel arise where there is some sort of blockage in the bed such as a crust formed by a layer of catalyst particles sticking together. To overcome this problem control means is provided to coordinate the flow of nitrogen gas into the vessel and the resulting gas pressure build up and maintenance in the catalyst bed and in the bottom of the vessel as well as in the vapor space of the vessel above the catalyst bed.

4 Claims, 1 Drawing Sheet

NITROGEN INSERTION PROTECTION SYSTEM

This application is a nonprovisional filing of U.S. provisional patent application Ser. No. 60/009,525, filed Dec. 28, 1995.

FIELD OF THE INVENTION

This invention pertains to improvements in the safety of a process for removing catalyst from a reactor vessel and to minimizing the cost of nitrogen consumed in the process of inerting the atmosphere of the reactor vessel.

BACKGROUND OF THE INVENTION

This invention was brought about by a tragic mishap involving a competitor of inventors'assignee. The subject invention allows safe working conditions while personnel are inside a catalyst containing vessel to remove catalyst. In this incident, workers were inside a vessel which had an obstruction between an inert gas supply and the vessel top vapor space leading to the vessel top outlet. A worker pierced this obstruction, and was literally blown out of the reactor, causing his death.

In accordance with the practice of the prior art, a vacuum hose with an attached nozzle is used for removing catalyst from a vessel. A worker within the vessel must wear a protective suit and mask since the interior of the catalyst vessel is maintained air-free because the catalyst is pyrophoric. An inert gas such as nitrogen is used to fill the space within and above the catalyst bed. Where nitrogen gas is introduced at the bottom of the vessel below the catalyst bed, a problem occurs with the buildup of pressure in a catalyst bed having a crust or other obstruction to the passage of the nitrogen or other inert gas through the catalyst bed from the bottom to the top of the vessel. Significant pressure can build under the crust before it breaks or before the worker breaks the crust with the removal nozzle or another tool.

Accordingly, the present invention in response to the above-described need in the art, provides the solution set forth hereinafter.

SUMMARY OF THE INVENTION

It has now been discovered that a danger of catalyst removal can be significantly decreased without reducing efficiency of the removal process by provision of a new means of controlling pressure within the catalyst bed. Problems with pressure in the bed arise where there is some sort of blockage in the bed such as a crust formed by a layer of catalyst particles sticking together. A nitrogen source is connected to the bottom of the vessel holding the catalyst bed. There is a pressure regulator between the nitrogen source, usually a plant nitrogen supply or a temporary truck, and the vessel. This source is often at a pressure upwards of 150 psig. The regulator reduces the pressure down to a specified maximum pressure of approximately 5–25 Psig. If the regulator fails, there is a safety relief valve which is set to release the nitrogen to the atmosphere if the nitrogen pressure exceeds a specified pressure. The pressure regulator is able to sense the pressure in the nitrogen line feeding the bottom of the vessel and the vapor space in the top of the vessel through the use of connections from these points to the pressure regulator actuator. This insures a positive inert atmosphere in the vessel. AT pressures below the specified setpoint in controller 11 and regulator 7, more nitrogen is introduced into the vessel via line 3. At pressures above the specified setpoints in controller 11 and regulator 7, the actuator on the regulator 7 will shut off the flow of nitrogen.

DESCRIPTION OF THE DRAWINGS

A schematic representation of the catalyst removal and pressure control apparatus is shown.

DESCRIPTION OF PREFERRED EMBODIMENTS

Figure 1:
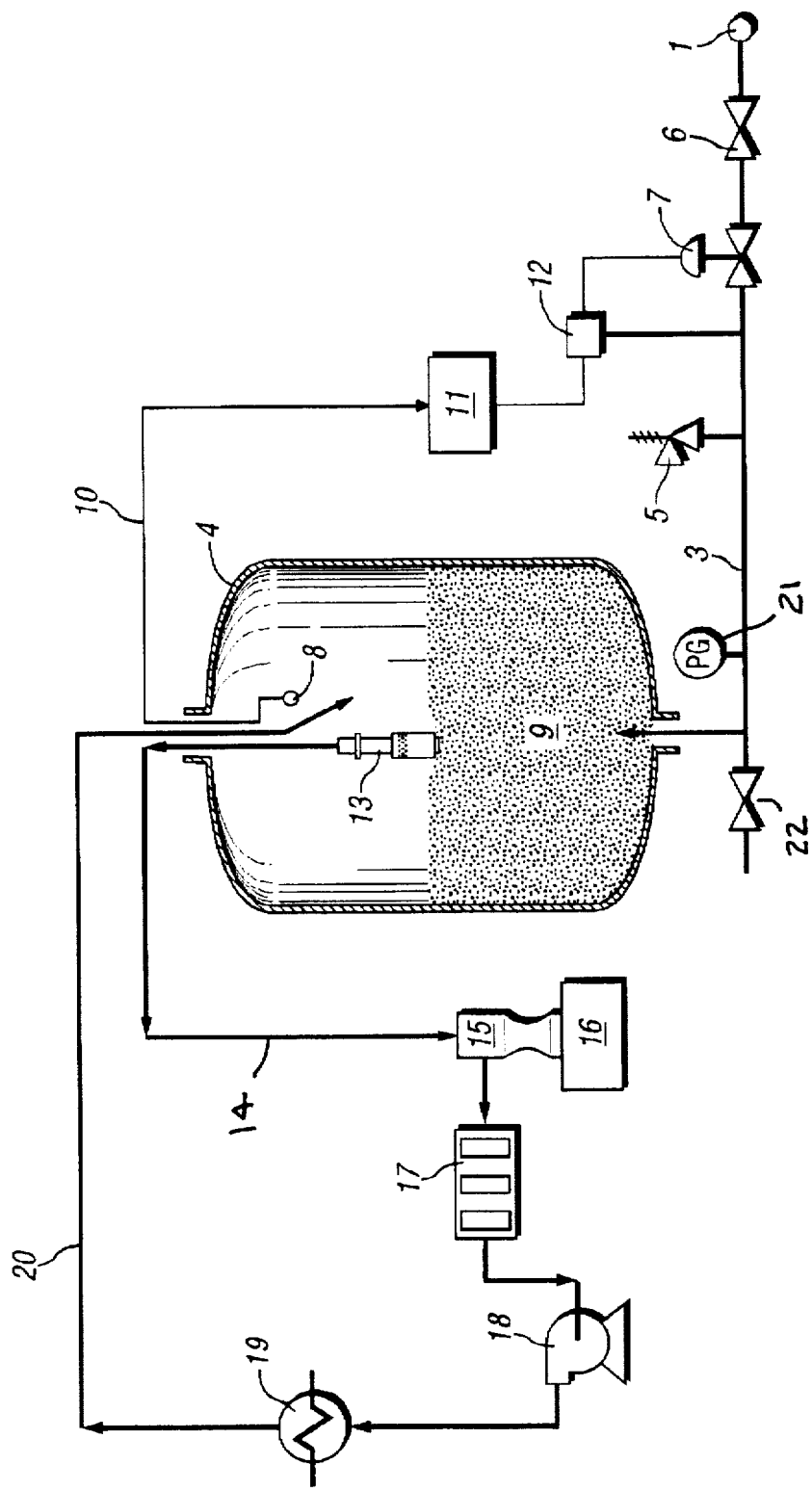

This invention pertains to a pressure control system. In one embodiment it may be used as an addition to the process for removing catalyst from a vessel by means of a nozzle, claimed in applicant's copending application Ser. No. 08/741,502, filed Oct. 31, 1996. However, this invention is not limited to use with the nozzle of applicant's copending application. This invention may be used with other nozzles or hoses may be used with systems where catalyst is dumped from the reactor using connections specifically there to remove the catalyst in order to reduce the amount of time personnel are in a confined space.

This invention is directed toward improving the safety of a catalyst removal process and minimizing the volume and cost of nitrogen consumed while providing an inert atmosphere in a vessel during the removal of self-heating and pyrophoric catalyst. In those occasions where it is necessary to introduce nitrogen into the bottom of the catalyst bed, a problem arises because there may be an obstruction in the bed which prevents the nitrogen from passing through the bed into the vapor space of the vessel or into the catalyst removal equipment. Pressure in the lower portion of the vessel below the top vapor space can build to dangerously high levels. In the instance where the catalyst forms a crust at the top of the bed, a worker may be positioned on top of the bed and plunge the catalyst removal nozzle, hose or other tool through the crust, causing immediate release of pressure and a large volume of nitrogen gas resulting in an injury to a worker or loss of life.

In carrying out the improvement of this disclosure, a nitrogen source 1 or other inert gas is connected via line 3 to the bottom inlet or side inlet of the catalyst vessel 4. A safety relief valve 5 is positioned in line 3 adjacent to the catalyst vessel 4. A pressure gauge 21 is positioned in line 3 to enable a worker to know the nitrogen pressure in line 3. A manual valve 22 is positioned in line 3 to enable a worker to vent the nitrogen pressure from line 3 to the atmosphere in the event of a high nitrogen pressure condition in line 3 and in the bottom of the vessel and prior to the system being shut down and disconnected from the vessel. A pressure regulator 7 is positioned in line 3 between nitrogen source 1 and safety relief valve 5. Control valve 6 is an optional extra manual control valve. The nitrogen source is usually a plant nitrogen supply or a temporary truck. This source is often at a pressure upwards of 150 psig. The regulator 7 is present to reduce the pressure down to preferably approximately 5–25 psig. If the regulator 7 fails, there is safety relief valve 5 which is set to release the nitrogen to the atmosphere if the pressure exceeds a specified pressure. The pressure regulator 7 is able to sense the pressure in the vessel 4 through the use of a pressure transmitter 8 located in the vapor space at the top of vessel 4 and over catalyst bed 9. Transmitter 8 is connected via line 10 to controller 11 which is connected to a pressure switch 12 which is connected to line 3 between pressure regulator 7 and safety relief valve 5. Pressure switch 12 in conjunction with controller 11 initiates operation of pressure regulator 7 pursuant to a signal of excessive or inadequate pressure in vessel 1. By reading of the nitrogen pressure measured by the pressure gauge 21 on line 3, it can be determined, prior to a worker entering vessel 4, that there is a pluggage problem in vessel 4. The high pressure in vessel 4 can then be relieved by opening the manual valve 22 on line 3 and venting the nitrogen in the bottom of the vessel to the atmosphere and a worker can safely enter vessel 4 and remove a crust or other blockage from the vessel. Monitoring of the pressure in vessel 4 continues during removal of the catalyst therefrom via nozzle 13. As above mentioned, the present invention is not limited to use with the nozzle system shown in the drawings, but can be used with other nozzle systems or can be used with systems where the catalyst is dumped from the reactor using connections on the reactor specifically there to remove the catalyst in order to reduce the amount of time personnel are in the confined space.

In the embodiment shown, line 14 carries the catalyst/gas mixture to cyclone 15 which separates catalyst from gas, depositing catalyst in bin 16 and sending gas containing catalyst fines to baghouse 17 where catalyst fines are separated, leaving catalyst free gas to go to pump 18 and then optionally to heat exchanger 19 and back to vessel 4 via line 20. This entire process can be shut down either simultaneously or sequentially by a signal from controller 11.

We claim:

1. An apparatus for improving the safety of removing a pyrophoric catalyst from a vessel, comprising:
    a conduit for passing inert gas to the bottom of a vessel containing the catalyst;
    a pressure regulator in said conduit, said pressure regulator effective in reducing pressure of said gas in said conduit to a range of about 5 to 25 psig;
    a pressure transmitter in the vessel for detecting pressure in a vapor space above the catalyst,
    a line connecting said pressure transmitter to means for actuating the pressure regulator to control the flow of gas into said vessel;
    a safety relief valve in the conduit between the pressure regulator and the vessel; and
    means for removing the catalyst from the vessel.

2. The apparatus of claim 1 wherein the means for actuating the pressure regulator includes a controller and a pressure switch.

3. A process for improving the safety of removing a pyrophoric catalyst from a vessel, comprising:
    providing a pressure regulator in a conduit between an inert gas source and the vessel;
    utilizing the regulator to reduce pressure from the source down to about 5 to 25 psig;
    providing a safety relief valve in the conduit between the pressure regulator and the vessel;
    utilizing the safety relief valve to release inert gas if the pressure exceeds a specified setting of 5 to 25 psig;
    providing means for enabling the pressure regulator to sense the pressure in the vessel through the use of a connection from a pressure transmitter to means for actuating the pressure regulator;
    actuating the pressure regulator; and
    removing catalyst and gas from the vessel.

4. The process of claim 3 wherein the means for actuating the pressure regulator is a controller and a pressure switch.

* * * * *